United States Patent [19]

Mackelburg et al.

[11] 4,270,142
[45] May 26, 1981

[54] ADAPTIVE SLANT RANGE COMPENSATOR FOR A REMOTE OPTICAL MAPPING SYSTEM

[75] Inventors: Gerald R. Mackelburg; Howard B. McCracken; Peter D. McCardell, all of San Diego, Calif.

[73] Assignee: The United Statets of America as represented by the Secretary of the Navy, Washington, D.C.

[21] Appl. No.: 970,584

[22] Filed: Dec. 18, 1978

[51] Int. Cl.³ .............................................. H04N 7/18
[52] U.S. Cl. ...................................... 358/99; 358/109
[58] Field of Search .................. 358/109, 293, 294, 95, 358/99, 160, 163, 164, 280, 282; 354/65

[56] References Cited

U.S. PATENT DOCUMENTS

| | | | |
|---|---|---|---|
| 3,316,348 | 4/1967 | Hufnagel et al. | 358/109 |
| 3,463,070 | 8/1969 | Miller et al. | 354/65 |
| 3,676,581 | 7/1972 | Swet | 358/109 |
| 3,775,735 | 11/1973 | Funk et al. | 358/99 |

Primary Examiner—Joseph A. Orsino, Jr.

[57] ABSTRACT

An adaptive slant range compensator, suitable for use with an optical mapping system for remote viewing, comprises a logarithmic amplifier which compresses an analog input signal having a wide range of values to a tractable range. An analog-to-digital (A/D) converter converts the compressed signal to a 10-bit binary number. The digitized compressed data is then used to address antilog programmable read-only memories (PROMs) which contain the antilog of the address data in scientific notation. Control and data processing circuits are used to accumulate sample scans from the antilog PROMs in a summing memory, calculate an average scan from the accumulated sample scans, and transfer this average to a working memory. The data stored in the working memory is used to drive an attenuation/amplification network that divides succeeding scans by the stored average scan. In this way, the inverse transfer function is applied to the analog input signal, which forms another input to the attenuation-/amplification network.

15 Claims, 20 Drawing Figures

OVERALL VIEW OF THE GEOMETRY OF THE REAL TIME OPTICAL MAPPING SYSTEM.

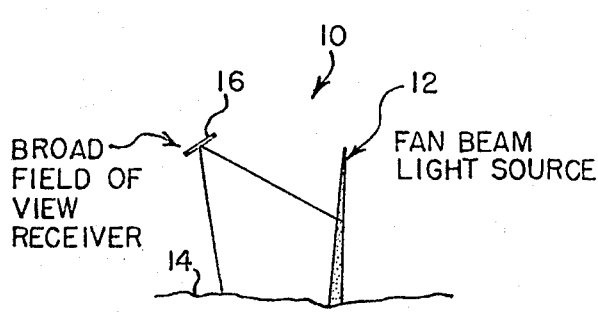
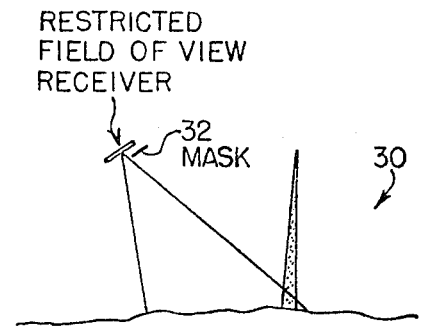
FIG. 1A.
BEAM PATTERN (NO MASK)
FIG. 2A.
BEAM PATTERN WITH IMAGE PLANE MASK
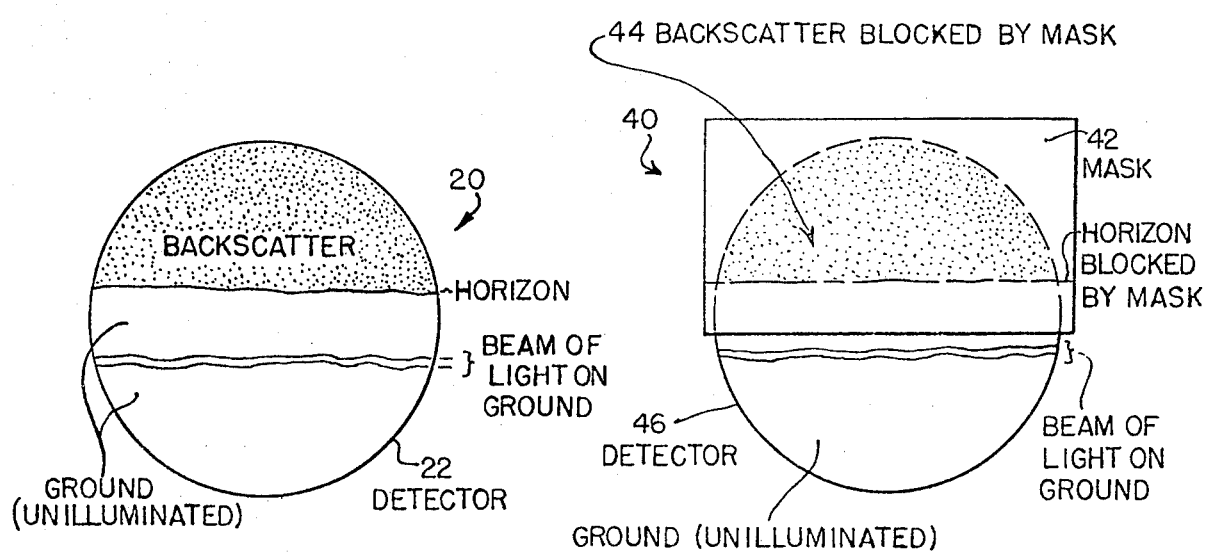
FIG. 1B. RESULTANT IMAGE
FIG. 2B. RESULTANT IMAGE USING AN IMAGE MASK GEOMETRY OF FIG. 1A
PROJECTED ONTO IMAGE PLANE
USING LINE-TO-CIRCLE
CONFORMAL MAPPING.

USE OF CIRCULAR MASK
ON LINE-TO-CIRCLE CONFORMAL
MAP SYSTEM SHOWN IN FIG. 3.

Z PLANE
$z = x + iy$

A SECTION THROUGH THE
OBJECT PLANE, SHOWING
A VERTICAL SLICE INTO
EARTH.

W PLANE
$w = u + iv$

THE IMAGE PLANE REPRESENTING
THE FACE OF THE PHOTOMULTIPLIER
TUBE IN THE OPTICAL SYSTEM.

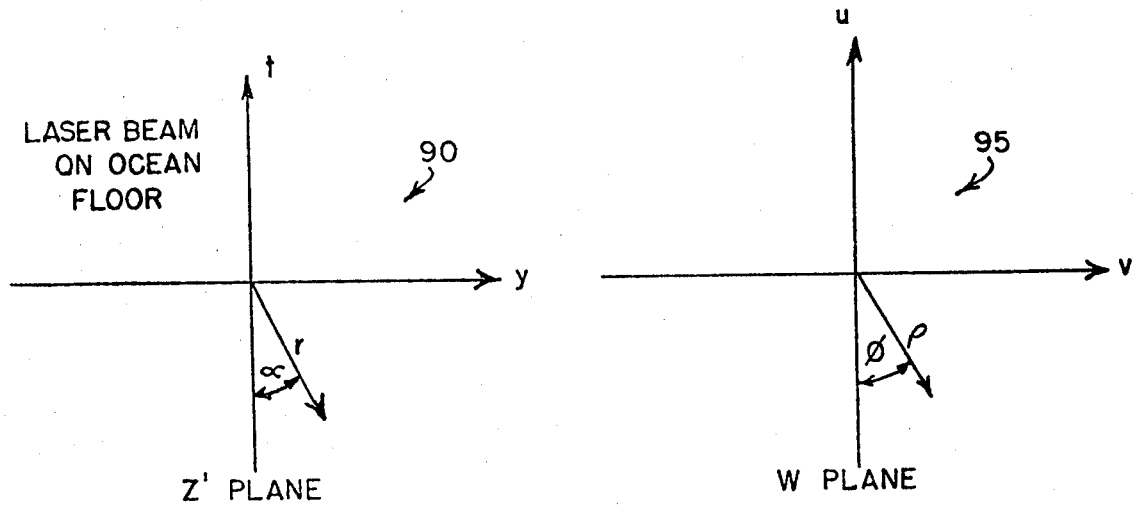
FIG. 6A.
THE OBJECT PLANE Z' SHOWING THE PLANE OF A FLAT OCEAN FLOOR
FIG. 6B.
IMAGE PLANE CORRESPONDING TO THE OBJECT PLANE Z' OF FIG. 6A
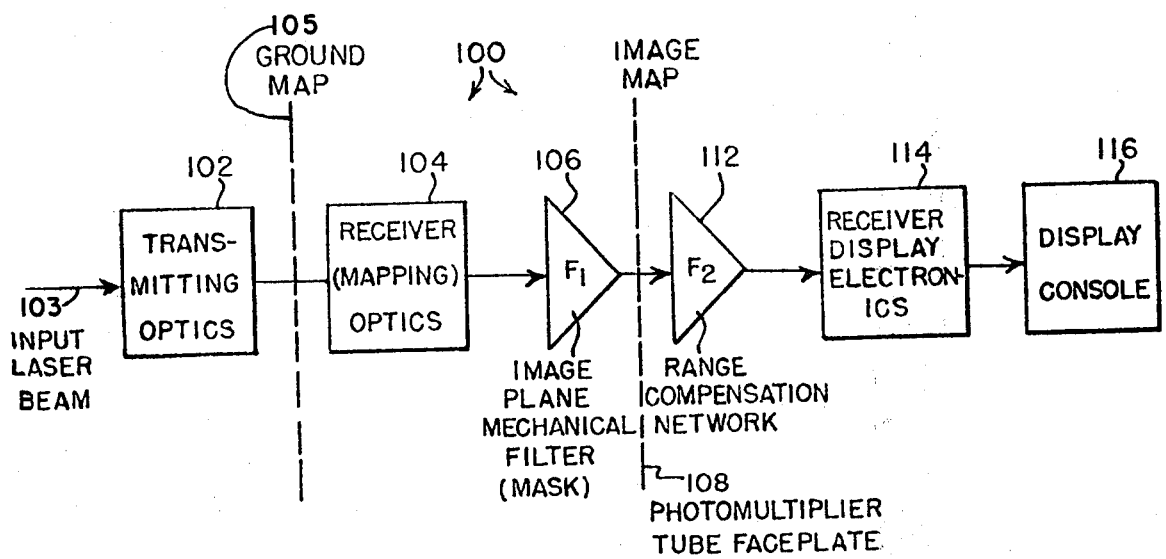
FIG. 7.
REAL TIME OPTICAL MAPPING SYSTEM

OVERALL VIEW OF THE GEOMETRY OF THE REAL TIME OPTICAL MAPPING SYSTEM.

SIMPLIFIED RECEIVER OPTICS SCHEMATIC IN THE O, P₁, P₂ PLANE SHOWN IN FIG. 8.

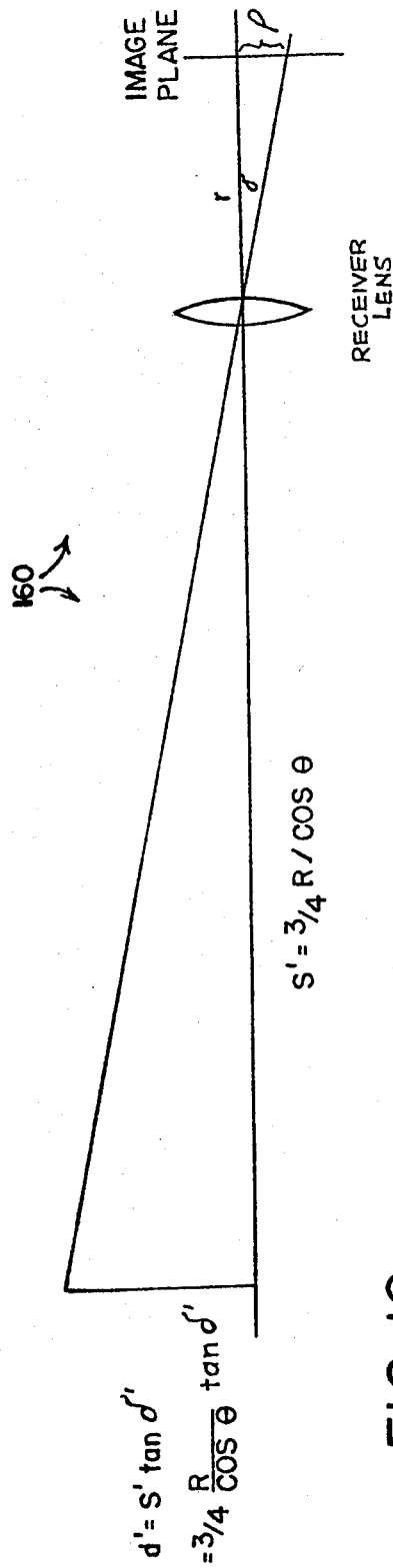
FIG. 10. SIMPLIFIED VERSION OF FIG. 9, DRAWN BY REPLACING THE AIR-WATER INTERFACE BY SUBSTITUTING EFFECTIVE DISTANCES.
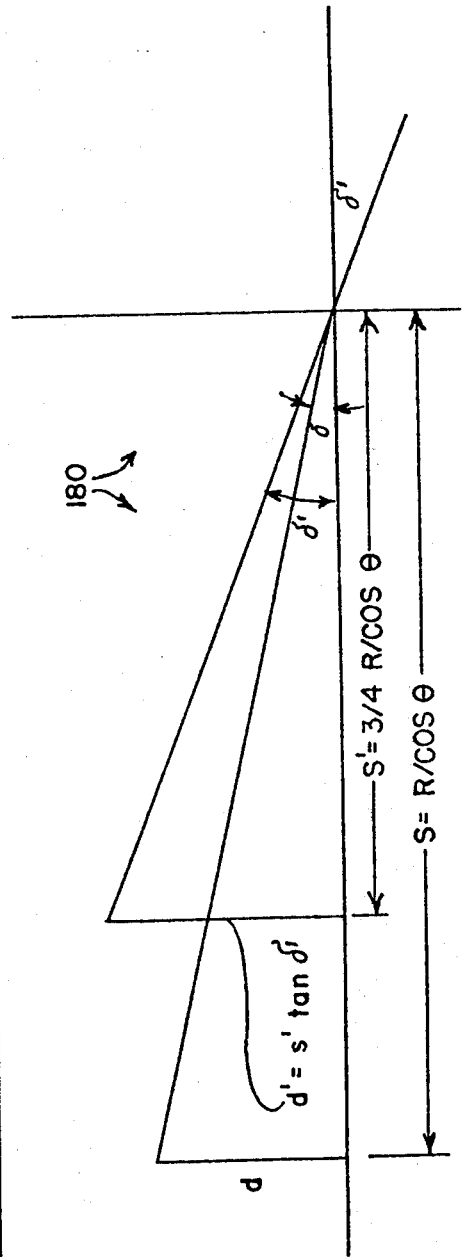
FIG. 11. CALCULATIONS OF EFFECTIVE DISTANCES FOR AIR-WATER INTERFACE.

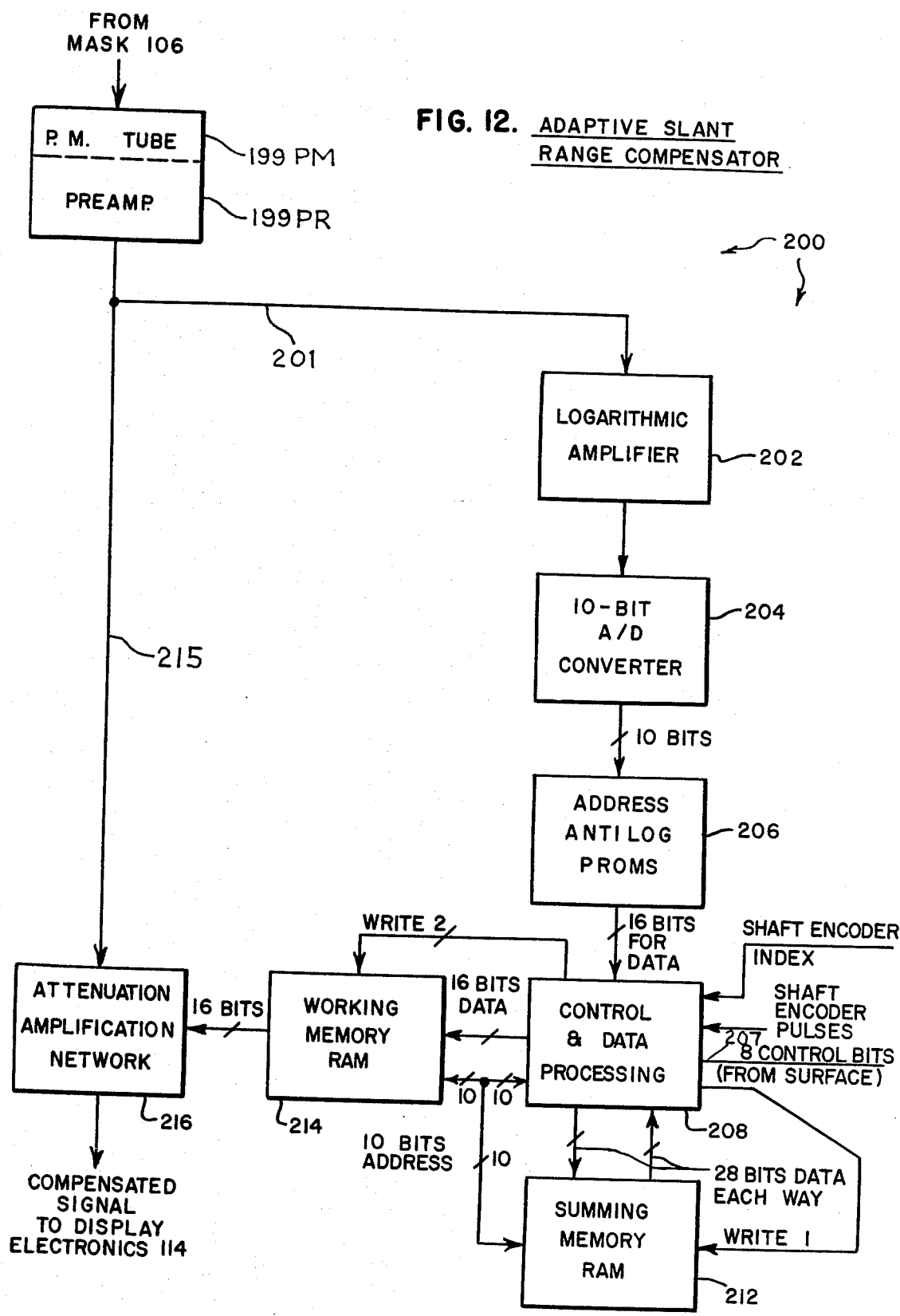

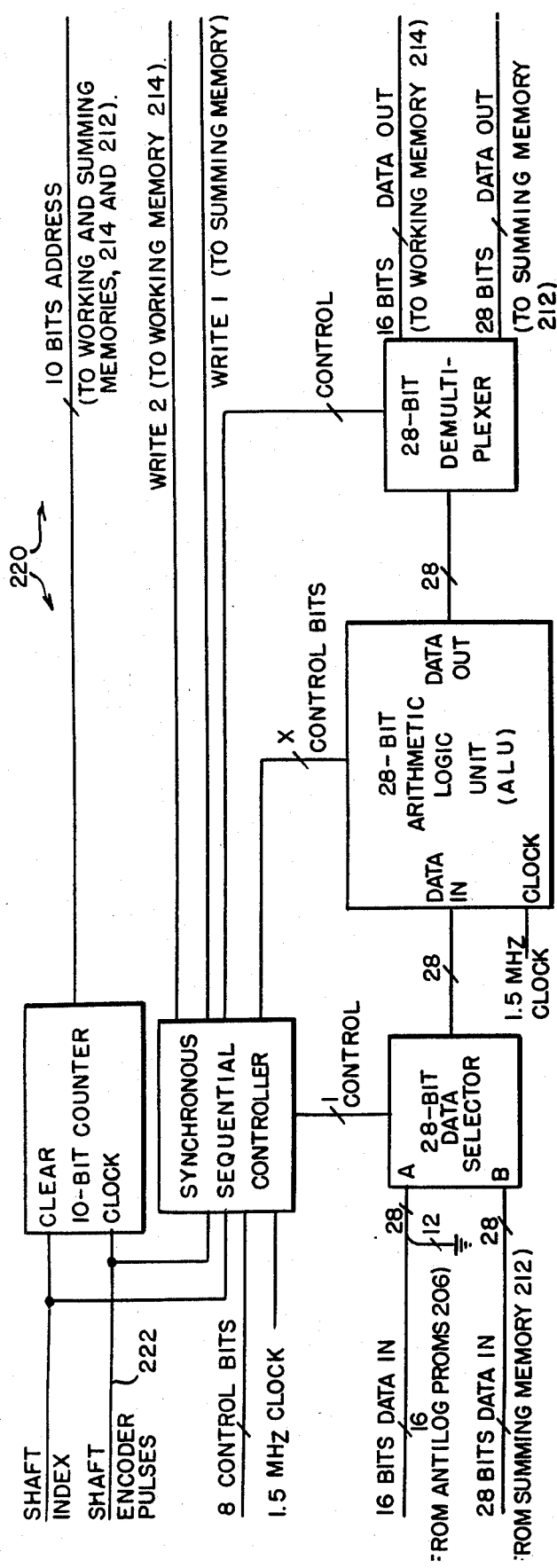
FIG. 13. CONTROL AND DATA PROCESSING.
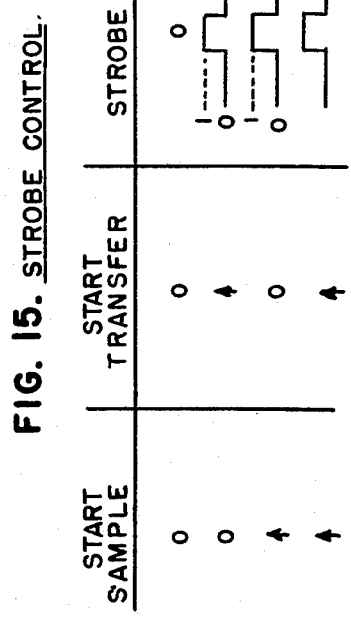
FIG. 15. STROBE CONTROL.
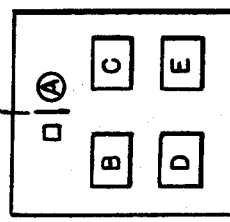
FIG. 14. CONTROLS FOR COMPENSATOR.
A.— THUMB WHEEL SWITCH FOR N.
B.— MOMENTARY PUSH BUTTON SWITCH FOR START SAMPLE.
C.— MOMENTARY PUSH BUTTON SWITCH FOR START TRANSFER.
D.— LATCHING PUSH BUTTON SWITCH FOR CONTINUOUS UPDATE.
E.— LATCHING PUSH BUTTON SWITCH FOR AUTOMATIC TRANSFER.
FIG. 16. STROBE WAVEFORMS.

ADAPTIVE SLANT RANGE COMPENSATOR FOR A REMOTE OPTICAL MAPPING SYSTEM

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATION

This application is a copending application with U.S. Pat. No. 4,143,400, which issued on Mar. 6, 1979.

BACKGROUND OF THE INVENTION

This invention relates to a spot scanning system capable of mapping an underwater area. In the line scanning prior art methods, every part of the line has the same intensity, for all practical purposes. However, in underwater scanning, this is not true because of the rapid attenuation of a light beam in water. A point in the middle of any line would reflect light of much greater intensity than light reflected from either end of the same line, since the distance traveled by the incident beam of light to the middle of each line is considerably less than to the ends of the same line, and hence the light intensity is attenuated less in the middle of the line. Since light attenuates exponentially underwater, this factor must be taken into consideration in any system used for underwater viewing.

This invention relates to a compensator which is used with an apparatus which optically maps underwater surfaces, may display the mapped image in real time on a cathode ray tube, or store the image in a video tape recorder. In operation, the system may be attached to either a towed or self-propelled underwater vehicle.

The apparatus with its compensator is an improvement over the Apparatus for scanning an underwater area, described in U.S. Pat. No. 3,775,735, to Funk et al, which issued on Nov. 27, 1973. Both inventions have the same assignee. Both inventions also involve a scanning spot which rotates in a circle or an arc of a circle.

The apparatus of the invention just mentioned in the paragraph immediately hereinabove, as well as of this invention, includes the following basic components: (1) a point light source which is spectrally optimized for underwater transmission; (2) collecting and collimating optics for the light source; (3) a dual prism and lenses mounted in a rotating cylinder; (4) receiving optics, for receiving the beam of light reflected from the target; (5) a photomultiplier tube, for converting the received beam of light into an electrical signal; (6) automatic gain control electronics, to compensate for the variable attenuation of the incident and reflected light beams; (7) a display cathode ray tube; or (8) a magnetic tape recorder, to display or record the target area; (9) a power supply, to supply energy where needed; and (10) underwater housings.

The invention specifically described herein relates primarily to item (6).

SUMMARY OF THE INVENTION

An optical system to be used with an illuminating source maps objects located in an underwater environment. A first optical means is adapted to receive light from the illuminating source, for transmitting the illumination to the object area to be mapped. A second optical means comprises an input means adapted to receive reflected light from the illuminated object area or plane; and an output means for conformally transforming images of all objects in the object plane to an image plane, located externally to the second optical means.

The optical system further comprises means located between the second optical means and the image plane, for filtering or masking light propagating between the two. Means, adapted to receive illumination from the filtering means, compensate for the absorption losses of the illumination as a function of the range, or distance, to various parts of the mapping area. Absorption losses can be measured in attenuation lengths $\alpha$. Typical units are logs per meter. In the system of this invention, the attenuation lengths involved are in the range of eight.

An adaptive slant range compensator, suitable for use with an optical mapping system for remote viewing, comprises a logarithmic amplifier which compresses an analog input signal having a wide range of values to a tractable range. An analog-to-digital (A/D) converter converts the compressed signal to a 10-bit binary number. The digitized compressed data is then used to address antilog programmable read-only memories (PROMs) which contain the antilog of the address data in scientific notation. Control and data processing circuits are used to accumulate sample scans from the antilog PROMs in a summing memory, calculate an average scan from the accumulated sample scans, and transfer this average to a working memory. The data stored in the working memory is used to drive an attenuation/amplification network that divides succeeding scans by the stored average scan. In this way, the inverse transfer function is applied to the analog input signal, which forms another input to the attenuation/amplification network.

Means, adapted to receive illumination from the compensating means, reverse the effects of the conformal mapping, to produce an image which is an accurate representation of objects in their underwater environment. The means may comprise a photomultiplier tube, which receives a light signal whose intensity changes with time. Means, adapted to receive the image from the reversing means, display the underwater objects in real time, for example, on a television screen.

OBJECTS OF THE INVENTION

An object of the invention is to provide a compensator for use with a system for scanning an underwater area which may be used either on a moving vehicle or on a stationary platform.

Another object of the invention is to provide a compensator which compensates for the differences in length of the beam path at various parts of the linear scan.

Yet another object of the invention is to provide a compensator which has the capability of automatically adapting to changing operating environments, i.e., it automatically adjusts to changing ocean floor characteristics (slant, reflectivity, etc.) as well as water column characteristics (attenuation etc.).

Still another object of the invention is to provide a compensator which does not require, as an input, the attenuation coefficient of the water.

These and other objects of the invention will become more readily apparent from the ensuing specification when taken together with the drawings.

BRIEF DESCRIPTION OF THE DRAWINGS

FIG. 1 comprises a pair of diagrams, FIG. 1A showing a beam pattern with no mask, and FIG. 1B showing the resultant image.

FIG. 2 is a pair of diagrams, comprising FIG. 2A, which shows a beam pattern with an image plane mask, and FIG. 2B which shows the resultant image using the mask.

FIG. 6 comprises a pair of coordinate systems, FIG. 6A illustrating the objects plane z' showing the plane of a flat ocean floor, and FIG. 6B illustrating the image plane corresponding to the object plane z' of FIG. 6A.

FIG. 7 is a block diagram of the real time optical mapping system of this invention.

FIG. 10 is a simplified diagram of FIG. 9, drawn by replacing the air-water interface by substituting the effective distances.

FIG. 11 is a diagram, similar to that shown in FIG. 10, which facilitates calculations of effective distances for air-water interface.

FIG. 12 is a block diagram of the adaptive slant range compensator, the main element of the invention.

FIG. 13 is a block diagram showing in more detail the control and data processing circuit of FIG. 12.

FIG. 14 is a diagrammatic view of the compensator controls.

FIG. 15 is a block diagram of the strobe control.

FIG. 16 is a set of graphs showing the strobe pulse waveforms.

DESCRIPTION OF THE PREFERRED EMBODIMENTS

Figure 3:
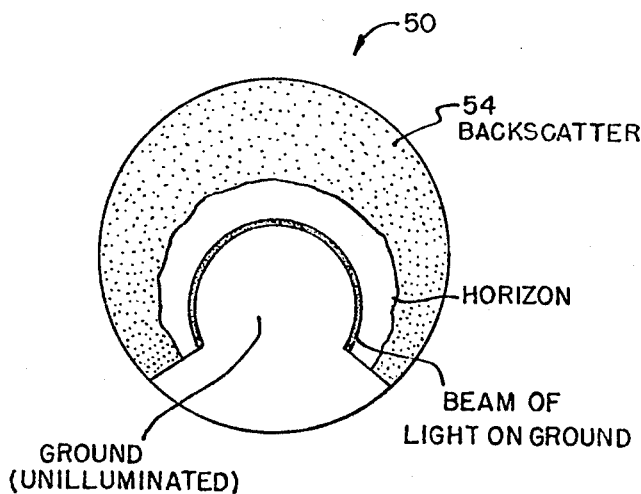
FIG. 3 is a diagram showing the geometry of FIG. 1A projected onto the image plane, using line-to-circle conformal mapping.

Before discussing the invention in detail, a few remarks will be directed to the backscatter reduction mechanism. Referring to FIG. 1, consider an optical system 10 producing a fan beam of light 12 which impinges upon the ground 14 (FIG. 1A) The lens 16 of a wide angle camera then focuses the object plane (the ground 14) onto the image plane and produces the image 20 shown in FIG. 1B. Here the backscatter is allowed to impinge upon a detector 22, and thereby degrades the signal-to-noise ratio, as manifested in a lowered contrast ratio of the output image.

On the other hand, if the field of view of the same system 20 were to be restricted through the use of a mehcanical mask 32 in the image plane (see FIG. 2A), an image would be produced such as is shown in FIG. 2B. Here, the mask 42 prevents the backscattered light 44 from reaching the detector 46. Now if the received image is not to be viewed directly but is only an intermediate step in detecting the returning signals, ordering them, and transmitting them to a remote display system, it is possible to project a distorted image on the detector providing it is possible to reorder it later. Thus one could conformally map the image on the detector and yet display a good, processed, image on a display console. A conformal mapping is a mapping of intersecting lines in one place, a z plane, into another plane, a w plane, in which the angles of intersection are preserved.

Using the appropriate optics system, therefore, one could project the image of the beam pattern 20 shown in FIG. 1B to the image 50 shown in FIG. 3. The backscatter 54 displayed on this image 50 (FIG. 3) could easily be removed using a circular aperture mask 62 as shown in FIG. 4.

Other optical systems might be used to provide alternate conformed maps of a line or point beam pattern on the ground, which could in turn be shielded from impinging backscatter through the use of other electromechanical masks controlled by a display console operator.

The choice of the conformal mapping scheme in any optical imaging system design would depend upon: (a) the simplicity of mask design; (b) the simplicity of the optics necessary to perform the conformal transformation; (c) the efficiency of the optics system necessary to perform the transformation; (d) the ease of retransforming the map into a usable image; and (e) general system tradeoffs.

Figure 4:
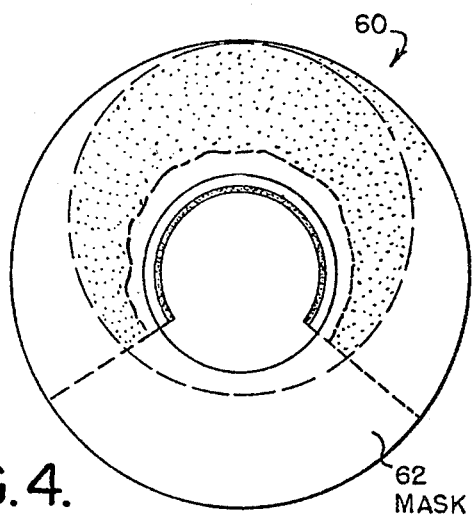
FIG. 4 is a diagram showing a circular mask superimposed upon the line-to-circle conformal map system shown in FIG. 3.

The particular system described in FIG. 3 and 4 is, in fact, the conformal mapping scheme used in a system actually built.

Figure 5A:
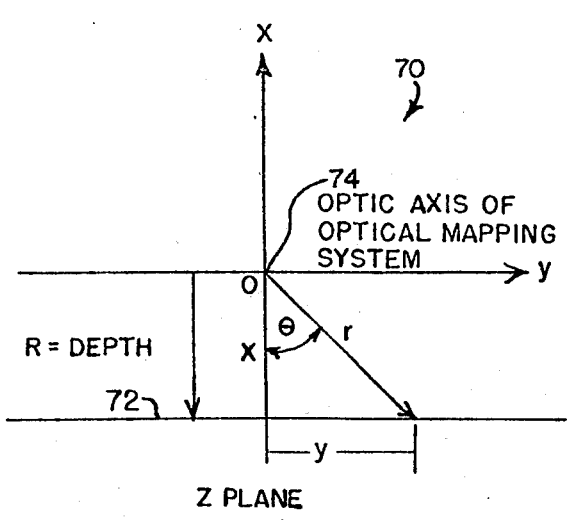
FIG. 5 comprises a pair of coordinate systems, FIG. 5A showing a section through the object plane, showing a vertical slice into the earth.
FIG. 5B shows the image plane representing the face of the photomultiplier in the optical system.
Figure 5B:
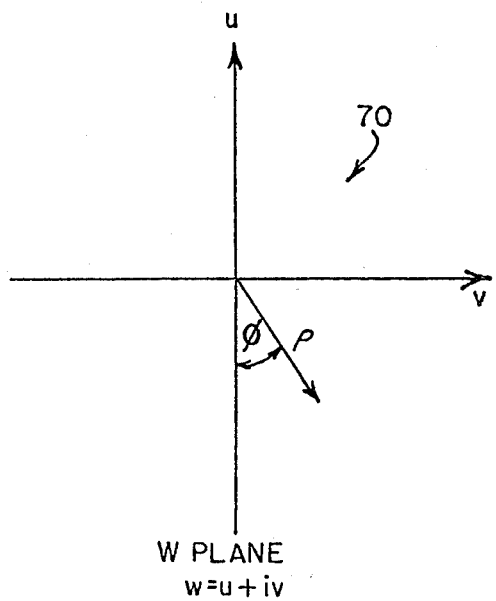

It will be instructional to determine the actual complex transformation by relating the object plane to the image plane of the optical system. To facilitate the determination of this relationship, a complex Cartesian coordinate system may be defined as shown in FIGS. 5A and 5B. FIG. 5A represents the object plane 70, or z plane, where X is the altitude off the bottom 72, Y is the direction of the scan line on the ocean floor, and the origin is situated at the center of the optic axis 74 of the optical system.

Figure 8:
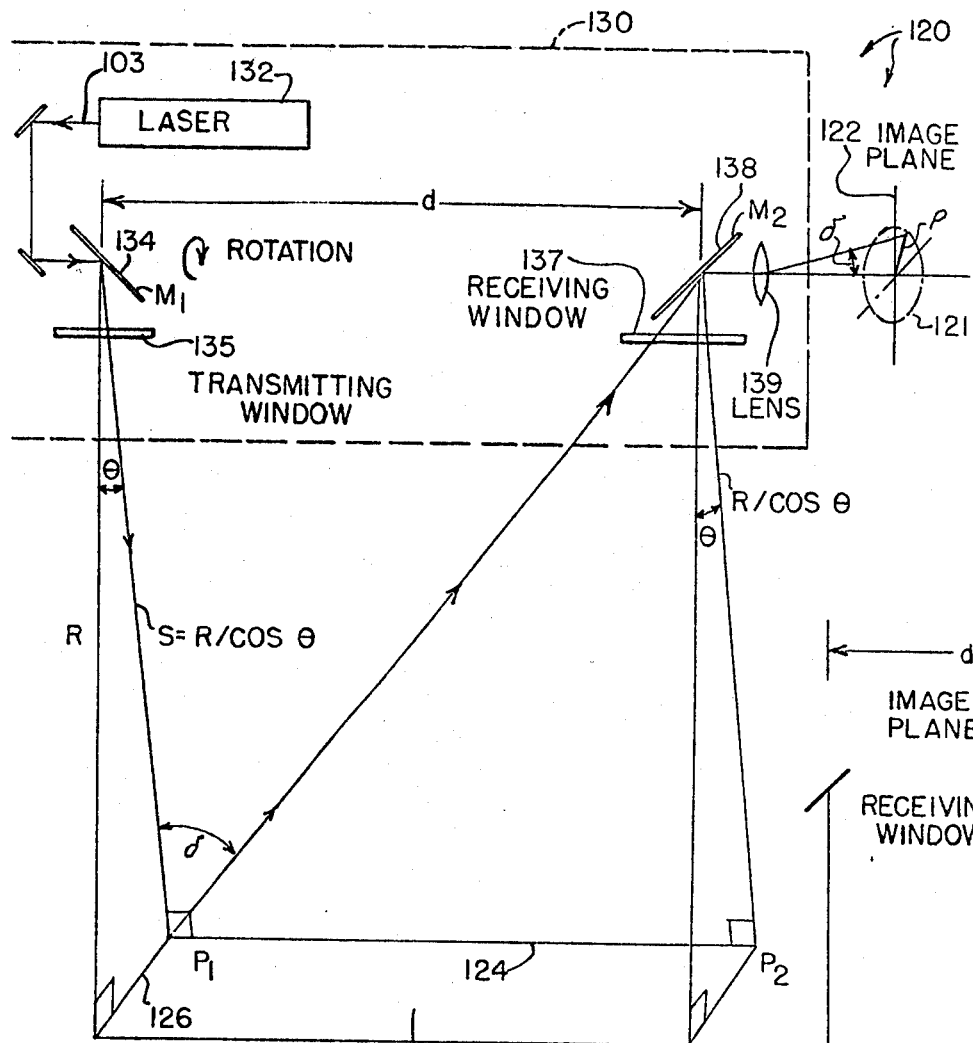
FIG. 8 is a diagram showing the overall view of the geometry of the real-time optical mapping system.

The transformation of this one altitude plane to the image plane w is shown in FIG. 5B. It may be shown that:

$$\rho(\theta) \simeq \frac{4}{3} \frac{fd}{R} \cos \theta \qquad (1)$$

where $\rho(\theta)$ is the polar plot of the irradiance incident upon a photomultiplier tube faceplate (i.e. w plane in polar coordinates);

the fraction $4/3 =$ the ratio $n_2/n_1 =$ the ratio of the index of refraction of water to air; and $f =$ lens focal length in meters, typically 0.75 m, with the receiver apertures quite large;

$d =$ separation distance of transmitting and receiving mirror in meters, typically 1.25 m;

$R =$ perpendicular distance to ocean bottom in meters, typically 40 m; and $\theta =$ sweep angle in radians, typically 2.09 radians. These parameters are shown in FIG. 8, to be discussed hereinbelow.

Grouping the system constants together, and substituting $R = -X$ as in FIG. 5A, Eqs. (2) and (3) are obtained:

$$A = \frac{4fd}{3}, \quad (2)$$

where A is the gain or magnification of the transformation; and $$\rho(\theta) = \frac{A}{-X} \cos \theta \quad (3)$$

These equations are actually a mixture of a Cartesian and polar coordinate nomenclature. Changing totally to polar coordinates, from FIG. 5A it may be seen that $$X = r \cos \theta \quad (4)$$

and $$\rho = \frac{A}{r} \angle 180° \quad (5)$$

Thus $$\rho = A/r \quad (6)$$

and $$\phi = -\theta \quad (7)$$

or, in Cartesian coordinates this is $$W = A/Z \text{ where } A = 4fd/3 \quad (8)$$

Equations (4) through (8) are the standard reciprocal transformation relationships found in the study of conformal mapping. They have the property that circles (including straight lines as "circles through ∞") map into circles. If the line is finite in length, the resulting transformation provides a circle that does not close on itself i.e. will map into a segment of a circle. Equations (4) through (8) do indeed represent the entire transformation between the vertical X, Y plane and the image U, V plane. This will be all that is mapped onto the image plane if all of the light from the bottom falls in that single line separated a distance d from the center of the receiver mirror. However, optics systems using lenses map a three-dimensional object fluid into a two dimensional image field. And, if there is other light illuminating the ocean floor or if the beam of light illuminating that floor does not traverse a straight line, the imaging system will also map that plane onto the image plane or W plane.

Therefore, consider a flat ocean bottom where the depth, R, is constant. Referring to FIG. 6A, define the ocean floor to lie in the Y, T plane. Use in made of Eq. (9), which is similar to Eq. (1).

$$\rho = \frac{4fd'}{3R} \cos \theta, \quad (9)$$

where d' is the effective distance d as seen through the flat, air-water, interface. Although d referred previously to the source-receiver separation distance, it was used to denote the distance between the line on the ocean floor and the center of the receiver mirror projected onto the bottom as a reference point (i.e. t=d=fixed constant). Since d' is now an independent variable, it can be denoted by T, recognizing that this is the apparent distance on the ground. Changing totally to rectangular coordinates, and utilizing the relations shown in FIG. 5A, the following equations are obtained:

$$\rho = \frac{4ft}{3} \frac{\cos \theta}{R} = \frac{4ft}{3} \frac{1}{\sqrt{y^2 + x^2}} \quad (10)$$

$$\text{or } \rho = \sqrt{u^2 + v^2} = \frac{4ft}{3} \frac{1}{\sqrt{x^2 + y^2}} \quad (11)$$

$$\text{or } |W| = \frac{4f}{3} t \left| \frac{1}{Z} \right| = B t \left| \frac{1}{Z} \right| \quad (12)$$

Thus, Eq. (12) states that as the line of light on the bottom is moved further away from the receiver optic axis, the conformal map in the image plane is a circle whose size is directly proportional to the effective distance t as seen through the air water interface.

The significance of the above calculations in practical design applications can be seen from the optical system 100 shown in FIG. 7. Transmitting optics 102 implements a mapping function which changes the spot produced by a collimated beam 103 of the laser into a line of light on the ocean floor. The receiving optics 104 maps a line of light on the ocean bottom into a circle of light in the image plane $F_1$. A mechanical filter prevents the backscatter from reaching the photomultiplier tube faceplate at 108.

The range compensation network 112 is an inverse filter to compensate for the general $e^{-\alpha R}$ absorption losses as a function of range.

The receiver display electronics 114 implements the transform of the mapping function which maps the circles on the image plane back into straight lines on the receiver display console 116. This particular function is accomplished electronically in a system which was built.

It is constructive to consider what a different transmitting optics 102 might do to the complexity of the system 100. If the transformation were such that it mapped a semicircle on the ocean floor rather than a straight line, this would then eliminate the changing R/cos term of the receiving optics 104, and thus the range compensation network 112 in FIG. 7 could be eliminated. This would tremendously simplify the receiving electronics 114. Unfortunately, because the implementation of Eq. 13 by the receiving optics 104 is no longer a simple reciprocal relationship (because t is no longer a fixed constant), circles will no longer map into circles, and the shape of the mask would no longer be a simple, round, aperture.

Referring now to FIG. 8, therein is shown a rotating apparatus 130 comprising a laser 132, first mirror 134, transmitting window 135, receiving window 137, second mirror 138, and lens 139. As the apparatus 130 rotates, each line scanned on the ocean buttom, for example line 126, is reproduced as a circle, or, generally, an arc of a circle, 121, on the image plane 122.

The rotation takes place about the axis through lens 139. As the linear mapping in the object plane proceeds from the left end of line 126 to the right end, at $P_1$, an arc of a circle is traced on the image plane 122.

The angle δ can be conveniently chosen to be 45°. The term f, in various equations, is the distance from lens 139 to the image plane 122.

Explained hereinbelow is a calculation of the light projected by the receiver optics 104 of FIG. 7, of the optical system 100, onto the image plane 122 of FIG. 8 as a function of the line of light 124 on the ocean floor.

Figure 9:
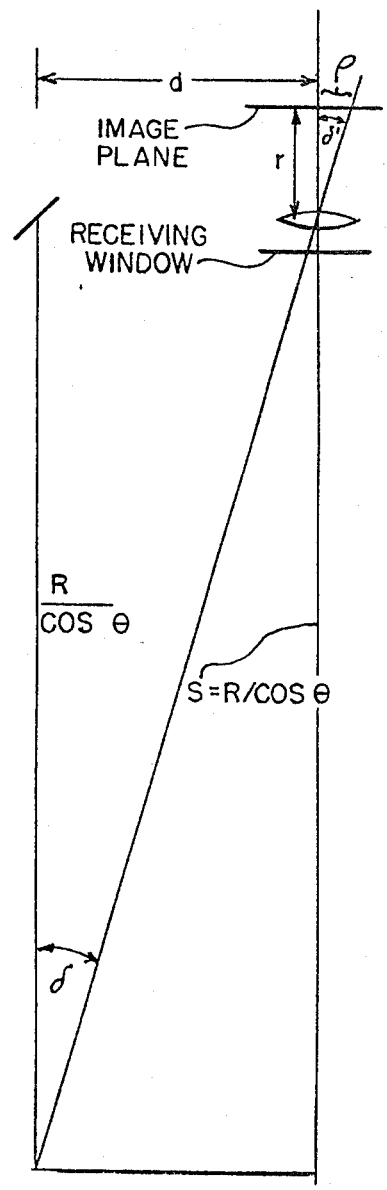
FIG. 9 is a diagram of a section of the mapping system shown in FIG. 8, somewhat modified.

Reference is now directed to the overall view of the geometry of the optical system 120 sketched out in FIG. 8. If now this geometry is transposed into a two dimensional schematic in the plane 0, $P_1$, $P_2$, and the optic path is straightened by eliminating the 90° angle caused by $M_2$, the diagram shown in FIG. 9 results. It is desired to relate $\rho$ in terms of R, $\theta$, d and f. It will be noted that FIG. 9 could be redrawn to eliminate the effects of the flat air-water interface, as is shown in FIG. 10. The calculation of the effective distances shown in FIG. 10 can be simplified by referring to FIG. 11. It will be noted that $$s' = \frac{n_1}{n_2} s \quad (14)$$

where $$s = R/\cos\theta \quad (15)$$

A typical distance for R would be 40 meters. Since $n_1/n_2$ is assumed to be equal to $\frac{3}{4}$, $$s = \frac{3R}{4\cos\theta} \quad (16)$$

It will be noted also from FIGS. 10 and 11, that $$d' = s'\tan\delta' \quad (17)$$

In summary, in the optical system 100 of this invention, the receiver optics 104 conformally maps the three-dimensional object plane of the ocean floor onto a two-dimensional image plane, in accordance with Eq. 13. For a given vertical plane through the ocean floor, this transformation has the property that it maps lines into circles and circles into circles. It was noted hereinabove that a circular scanning system could utilize the same receiver optics but that the mask would have to be modified considerably. However, such a circular scan would eliminate the necessity of using complex range compensation circuitry 112 to get rid of the effects of the varying $R/\cos\theta$ attenuation losses of a line scan system.

In addition, block diagrams incorporating the effects of spacial filters 106, optical and electronic conformal transformations and amplitude filters 112, such as that shown in FIG. 7 can be useful to see the effects of changes in the electro-optical system design.

Referring to FIG. 10 and using the lens equation, $$\frac{1}{r} + \frac{1}{s} = \frac{1}{f}, \quad (18)$$

leads to $$r = \frac{fs'}{s' - f} = \frac{3fR}{3R - 4f\cos\theta} \quad (19)$$

by use of Eqs. (14) and (16).

It will be noted also that, in FIG. 10, $$\rho = \frac{rd'}{s'} = r\tan\delta \quad (20)$$

$$= \frac{3fR - \tan\delta'}{3R - 4f\cos\theta} \quad (21)$$

by use of Eq. (19).

If $\delta$ and $\delta'$ are small, as may be seen from FIG. 11, $$\tan\delta' = \tan\frac{4}{3}\delta = \tan\frac{4}{3}\frac{d\cos\theta}{R}; \quad (22)$$

and since $$\frac{d\cos\theta}{R} \approx \frac{3}{20} \quad (23)$$

is small, then $$\tan\delta \approx \frac{4}{3}\frac{d\cos\theta}{R} \quad (24)$$

$$\text{and } \delta \approx \frac{4fd\cos\theta}{3R - 4f\cos\theta}, \quad (25)$$

by use of Eqs. (21) and (24).

If, in addition $$f << R \quad (26)$$

$$\rho \approx \frac{4fd\cos\theta}{3R} \quad (27)$$

Although Eq. (27) is useful for small angles, another expression can be derived from Eqs. (20) and (16) which is useful for envisioning the resultant pattern for large $\delta$.

$$\rho = \frac{rd'}{s'} = \frac{4rd'}{3R}\cos\theta \quad (28)$$

If R is large compared to r, then $$r \approx f \quad (29)$$

= the focal length of the lens, and $$\rho \approx \frac{4fd'}{3R}\cos\theta \quad (30)$$

Before describing an embodiment actually built, a few preliminary remarks should be useful. Referring to FIG. 12, briefly, the actual signal path splits into two paths 201 and 215. The output is compressed in path 201, in amplifier 202. A group of scans are averaged together. When the average is completed, the average is used to digitally control attenuation network 216. Actually, the attenuations are done on the succeeding scans, and not on the averaged ones.

The number of scans averaged is controllable. It is determined by three of the 8 control bits, at lead 207. The number of scans required is determined by a thumb wheel switch 262, FIG. 14, on the control panel. It causes to be generated three of the 8 control bits, on lead 207 in FIG. 12. Anywhere from one scan up to 512 ($=8^3$) can be generated.

An operator would look at the output stage and he would know empirically from experience approximately how many scans would be required.

The number of required scans might vary, if there were a very rugged ocean bottom, or if there were canyons in spots even more scans may be required.

The scanning is done over a 120° radial sector. A shaft encoder, which synchronizes with the scanning, puts out 1024 pulses 222, FIG. 13, for each scan. So that means that the scan of 120° would be split up into 1024 segments, each representing a brightness level. The brightness level of each of the 1024 segments is taken in analog form, and then each of the 1024 levels is digitized.

FIG. 12 may be considered a flowchart for one particular value of the 1024 levels per scan.

Briefly describing the signal path in lead 201, there is a photomultiplier tube preamp 199PR, out of which comes an analog output voltage. This analog output voltage is then logarithmically compressed in amplifier 202. The log of it is taken, and it then goes to the 10-bit A/D converter 204. The 10-bit A/D converter 204 then addresses part of the memory 206, depending on what the 10-bit value is. It addresses a 16-bit word memory 206 which contains the antilog of this original number in scientific notation, that is, in powers of 8. When done in that way, so many bits do not have to be used. A 17-bit machine would normally be required to do this work.

In a specific embodiment of the optical system, 100 in FIG. 7, the compensating means 112 comprises means 202, whose input may be connected to the output of the photomultiplier tube 199PM, for logarithmically amplifying, or compressing, its input signal, the output signal being a compressed analog signal. The brightness level may vary over a range of 80 db, that is, by a factor of 10,000. In other words, the brightness of the poorest, dimmest light, is 80 db below the maximum light. With 80 db of attenuation if one did not use scientific notation it would be almost impossible to cover such a wide range of brightness levels.

Means 204, whose input is connected to the log amplifying means 202, converts its input analog signal into an output digital signal. The value of the brightness level is in binary form at this point. As stated hereinabove, the levels would be sequential, from data #1 of the first line scanned to data #1024 of the last line.

Means 206, whose input is connected to the output of the A/D converting means 204, stores the antilog values of the digitized input signals. PROM 206 is a look-up table. The various brightness levels have corresponding binary numbers, in scientific notation, in the various cells of the memory. The output of PROM 206 comprises the elements in sequential form, first all the elements of one line, then all the elements of the next line.

If the area scanned is compared to a matrix, then the scanning is sequential, all the elements of the top row being scanned first, for example, from left to right, through all the elements of the bottom row.

Control means 208, whose input is connected to the output of the antilog processing means 206, sequentially retrieves information from the antilog storing means.

Means 212, whose input is connected to the output of the control means 208, accumulates sample scans and calculates an average element-by-element scan from the accumulated sample scans, the value of the average scan then being sent back to the control means 208.

Means 214, whose input is connected to the output of the control means 208, stores the average value of the scans, element by element.

Means 216, whose input is connected to the output of the scan storing means 214, divides succeeding scans by the stored average scan, Another input to this means may be connected to the output of the photomultiplier tube 199PM, the output of signal of the modifying means 216 comprising a compensated signal which is connected to the input of the displaying means.

A means 199PR, whose input is connected to the output of the photomultiplier tube 199PM and whose output is connected to the input of the logarithmic amplifying means 202 would generally be included for amplifying the output signal from the photomultiplier tube.

The antilog storing means 206 comprises programmable read-only memories (PROMs), and in a specific embodiment built, constitutes a "look-up" table.

The theory with respect to the Adaptive Slant Range Compensator 200, of FIG. 12. and with one of its major elements, the control and data processing circuit 220 of FIG. 13 will now be discussed.

The three-faceted scanning mirror used with the optical mapping system can rotate at up to 1000 RPM. A digital output shaft encoder divides each revolution into 3072 increments. Therefore, the time between each increment is $$\frac{1 \text{ min.}}{1000 \text{ rev.}} \times \frac{60 \text{ sec.}}{1 \text{ min.}} \times \frac{1 \text{ rev.}}{3072 \text{ inc.}} = 19.5 \, \mu \text{ sec.}$$

Each scan is divided into 1024 increments (3 scans per revolution), by a shaft encoder, whose output is shown at 222. The circuit 200 calculates the sum and average for each one of these 1024 increments (values of scan angle $\theta$) and uses it to weigh the signal, by means of attenuation network 216, at the corresponding value of $\theta$ of the succeeding scans. In this way, slant range compensation is applied to the input signal at 215.

As stated hereinabove, the dynamic range of the input signal due to variations in the scan angle (slant range effect) can be as high as 80 db. To maintain an accuracy of 10% over this range, an A/D converter would require a resolution of $1:10^5$. A 16-bit converter would barely approach this resolution ($2^{16} = 65,536$). As an alternative, a logarithmic amplifier 202 was used to compress the dynamic range of the sample signal. The output of the log amp 202 is then A/D converted (10 bits), in A/D converter 204 and applied to the address lines of an antilog look-up PROM 206. In this way, both the dynamic range requirement and the accuracy requirements can be met (5% accuracy using this approach).

Each word in the PROMs 206 contains the antilog of the input signal that generated the word's address, in scientific notation (base 8), i.e., the PROMs contain an antilog look-up table.

During the summing operation, the machine looks at the power of 8 of the input data and the stored sum (for each one of the 1024 values of scanning angle $\theta$). If the powers are equal, the two data words associated with these powers of 8 are added and the sum is stored in the summing memory 212. If the difference in the power is greater than two, the new data for that value of $\theta$ is not assumed into the summing memory 212. It is omitted from the computation of the average. The circuit 212 then waits for the next value of 74.

If the powers of 8 of the input and the sum data are not equal and are less than two apart, the binary data with the lowest exponent is shifted right 3 bits and its power is incremented until the powers are equal. The summing process then proceeds as in the explanation hereinabove.

After 1024 adds are completed $8^N$ times ($8^N$ full scans), the summing random-access memory (RAM) 212 contains the completed sum. The average is then computed by shifting the sum data right:

$N \times 3$ bits for $N \leq B$ 9 bits for $N<3$ (this gives us the most significant bits of the sum for the working average RAM 214); and by subtracting 0 for $N \leq 3$ $N-3$ for $N<3$ from the sum's exponent. This gives the average which is stored in the working memory 214.

The average data stored in the working average RAM 214 is then divided into the succeeding scans, and the level is shifted so that the output is proportional to the fractional change in bottom reflectivity from the average at a given value of $\theta$ (scan angle).

There are two modes of automatic operation that this circuit, 200 in FIG. 12, can assume via the control inputs. These are the "automatic transfer mode", and the "continuous update mode". Reference is directed to the TABLE hereinbelow and to FIG. 16, wherein the strobe waveforms are shown.

In the continuous update mode, the circuit 200, FIG. 12, will continuously update the weighing average, stored in the working memory 214. It does this by automatically generating start sample and start transfer commands (FIG. 15) at the appropriate times, to ensure that new averages will be formed each time an average has been completed and transferred to the working memory 214, FIG. 12.

In the automatic transfer mode, the circuit 208 will automatically transfer a newly calculated average to the working memory 214 upon completion of the averaging process. This will happen each time a new average scan has been accumulated, i.e., each time the start sample command, FIG. 15, is received, (after a processing delay).

The commands available for manual operation are the start sample and start transfer commands, FIG. 15. These are pushbutton type commands that enable one execution, of the appropriate command, to be performed.

When strobed in high, a start-sample command will start the process of adding scans into the summing memory 212, if the machine 200 is not busy. If the machine 200 is busy when the start-sample command is received, the machine will wait until the execution of that mode has been completed before starting the start-sample sequence.

The start-sample sequence causes the summing memory 212 to be loaded with one scan, and the desired number of sample scans ($8^N-1$) to be added into it. This will occur each time the start-sample command is strobed into the machine.

When high, FIG. 16, an "automatic-transfer" command will cause the average of the scan stored in the summing memory 212 to be tranferred to the working memory 214. This will occur each time a new average scan has been completed, until execution has been completed after automatic transfer goes low.

When strobed in high, a "start-transfer" command will cause the average of the scan stored in the summing memory 212 to be transferred to the working memory 214, provided the machine is not busy. If busy, the transfer action will be delayed until the machine is ready.

The work "strobe" as used herein designates a pulse that is generated by depressing the "start-sample" or "start-transfer" push buttons, B and C in FIG. 14. The automatic and manual operation is summarized in the TABLE.

When high, a "continuous update" command will automatically generate start-sample and start-transfer commands at the appropriate times. In this way the working memory 214 is being continuously updated with new averages each time they are computed. This activity will continue until execution is completed after continuous-update goes low.

A 3-bit binary number N determines the number of scans to be accumulated prior to computing the average. Number of scans used in average $=8^N=512$ maximum. If N is changed before an average has been completed, the machine, 200 FIG. 12, will continue to use the old N until the average has been completed. Once completed, the new N will be used to compute future averages.

TABLE

| Control Inputs | Control and Data Processing (8 bits from surface control console) |
|---|---|
| 3 bits = N | No. of samples in average = $8^N$ |
| 1 bit | Start Sample |
| 1 bit | Start Transfer |
| 1 bit | Automatic Transfer |
| 1 bit | Continuous Update |
| 1 bit | Strobe |

Obviously, many modifications and variations of the present invention are possible in the light of the above teachings, and, it is therefore understood that within the scope of the disclosed inventive concept, the invention may be practiced otherwise than as specifically described.

What is claimed is:

1. An optical system, to be used with a light source, for mapping objects located in an underwater environment, comprising:
    a first optical means, adapted to receive light from the light source, for transmitting the light produced by the light source to the object area to be mapped, thereby illuminating the area; and
    a second optical means comprising:
        an input means, adapted to receive reflected light from the illuminated object area, or plane;
        an output means for conformally transforming, that is, conformally mapping, images of all objects in the object plane to an image plane located externally of the second optical means: and
    means, disposed between the second optical means and the image plane, for masking light propagating between the optical means and the image plane, the masking means having a circular configuration; and
    means adapted to receive illumination from the transforming means, for compensating for the absorption losses of the light as a function of the range to various parts of the object area.

2. The optical system according to claim 1, further comprising:
    means, adapted to receive light from the masking means, for reversing the effects of the conformal mapping, that is, for performing an inverse transformation, to result in an image which is an accurate representation of objects in their underwater environment.

3. The optical system according to claim 2, further comprising:

means, adapted to receive the image from the inverse transformation means, for displaying the underwater objects in real time.

4. The optical system according to claim 3, further comprising:
the light source.

5. The optical system according to claim 4, wherein:
the light source is a laser.

6. The optical system according to claim 5, wherein:
the inverse transformation means comprises a photomultiplier.

7. The optical system according to claim 6, wherein:
the displaying means comprises a television system.

8. The optical system according to claim 7, wherein:
the first and second optical means comprise means which rotate about an axis parallel to the surface of water.

9. The optical system according to claim 8, wherein the first optical means comprises:
a first mirror, adapted to receive light from the light source, which is capable of pivoting about an axis perpendicular to the axis of rotation; and
a transmitting window, adapted to receive the light from the first mirror and pass it through to the object area.

10. The optical system according to claim 9, wherein the second optical means comprises:
an input means which comprises:
a receiving window, adapted to receive and then transmit light from the object plane; and
a second mirror, adapted to receive light from the receiving window; and wherein:
the output means comprises a focusing lens, adapted to receive light from the second mirror and focus it upon the image plane.

11. The optical system according to claim 10, wherein the mapping is accomplished by line-by-line and element-by-element scanning of an object area, each line defining a radial sector angle $\theta$, and wherein the compensating means comprises:
means, whose input is connected to the output of the photomultiplier tube, for logarithmically amplifying its input signal, the output signal being a compressed analog signal;
means, whose input is connected to the log amplifying means, for converting its input analog signal into an output digital signal;
means, whose input is connected to the output of the A/D converting means, for storing antilog values of the digitized input signals;
control means, whose input is connected to the output of the antilog storing means, for sequentially retrieving information from the antilog processing means;
means, whose input is connected to the output of the control means, for accumulating sample scans of each element and calculating an average value of the light intensity of each scan of each element from the accumulated sample scans, the value of the average scan then being sent back to the control means;
means, whose input is connected to the output of the control means, for storing the average value of the scans;
means, whose input is connected to the output of the scan storing means and whose output comprises a signal proportional to light intensity, for dividing the values of succeeding scans by the value of the stored average scan, shifting the light intensity so that the light output is proportional to the fractional change in the light intensity reflected by the object area from the average light intensity at a given value of the scan angle $\theta$, another input to this means being connected to the output of the photomultiplier tube, the output signal of the dividing means comprising a compensated signal which is connected to the input of the displaying means.

12. An optical system according to claim 11, further comprising:
means, whose input is connected to the output of the photomultiplier tube and whose output is connected to the input of the logarithmic amplifying means, for amplifying the output signal from the photomultiplier tube.

13. The optical system according to claim 12, wherein:
the antilog storing means comprises programmable read-only memories (PROMs).

14. The compensating system according to claim 12, wherein:
the antilog storing means comprises programmable read-only memories (PROMs).

15. A light-intensity compensating system, for use with a mapping system utilizing line-by-line and element-by-element scanning of an object area, each line defining a radial sector angle $\theta$, the system comprising:
means for logarithmically amplifying an input signal, the output signal being a compressed analog signal:
means, whose input is connected to the log amplifying means, for converting its input analog signal into an output digital signal;
means, whose input is connected to the output of the A/D converting means, for storing antilog values of the digitized input signals;
control means, whose input is connected to the output of the antilog storing means, for sequentially retrieving information from the antilog processing means;
means whose input is connected to the output of the control means, for accumulating sample scans of each element and calculating an average value of the light intensity of each scan of each element from the accumulated sample scans, the value of the average scan then being sent back the control means;
means, whose input is connected to the output of the control means, for storing the average value of the scans;
means, whose input is connected to the output of the scan storing means and whose output comprise a signal proportional to light intensity, for dividing the values of the succeeding scans by the value of the stored average scan, shifting the light intensity so that the light output is proportional to the fractional change in the light intensity reflected by the object areas from the average light intensity at a given value of the scan angle $\theta$.

* * * * *